3,849,541
PROCESS FOR PURIFYING FUMES
Charles Bertrand, 49 Rue Gadeau de Kerville,
Satteville-les-Rouen, France
Continuation-in-part of abandoned application Ser. No. 871,822, Oct. 28, 1969. This application May 24, 1972, Ser. No. 256,454
Claims priority, application France, Nov. 4, 1968, 7,241; Dec. 30, 1968, 7,247; Aug. 1, 1969, 6926450
Int. Cl. C01b 13/00
U.S. Cl. 423—242                              13 Claims

ABSTRACT OF THE DISCLOSURE

A process for purifying fumes which contain impurities, particularly sulphur dioxide, comprises at least one step consisting of a reaction in liquid phase with carrier fluid in which ozone has been absorbed prior to the reaction, the carrier fluid being preferably oleum or sulphuric acid.

---

Figure 1:
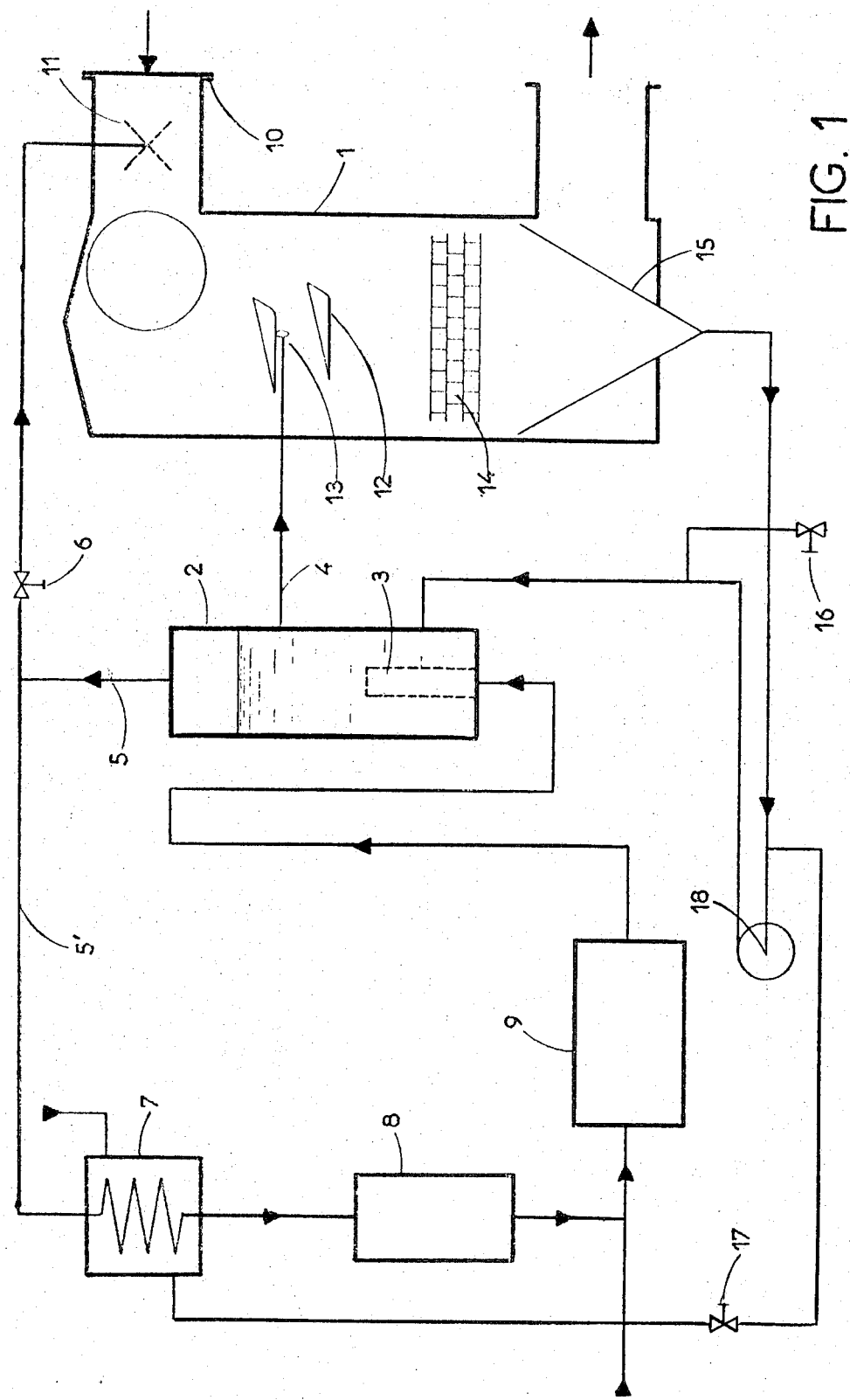

This is a Continuation-in-Part Application of copending application Ser. No. 871,822 filed Oct. 28, 1969 now abandoned.

This invention relates to an improved process for purifying gaseous effluents which contain, as impurities, oxides of sulphur. This invention also relates to an installation for using such process.

It is generally accepted that the harmful and polluting properties of oxides of sulphur and of certain oxides of nitrogen render it necessary to purify gaseous effluents containing such gases before discharging them into the atmosphere. These gaseous effluents are produced, for example, in heated spaces having either cold walls or hot walls, oxides of sulphur generally being produced by the oxidation of sulphur present in fuels used for combustion purposes. It is generally economically desirable to attempt to recover these gases in the form of acids or salts of these acids, particularly in the form of sulphuric acid, oleum or sulphonitric acid.

Numerous processes for purifying gaseous industrial effluents of this type are known. For example, it has been suggested by Kashtanov and Rhnizov in J. Gen. Chem. U.S.S.R. (1936), 6, 549, to treat the $SO_2$-containing fumes or smoke from power stations with ozonized oxygen. However, know processes for the treatment of fumes with ozone do not allow the degree of purification generally desired to be achieved.

Tarbutton et al., U.S. Pat. No. 2,926,999, suggested that $SO_2$ could be recovered from waste gases by mixing the waste gases with ozone and passing them up a packed tower while passing sulfuric acid and an aqueous solution of manganese ion counter-currently. It was disclosed that the ozone functioned as a promoter of manganese catalyst. Drawbacks to this process, however, are the necessity of the use of manganese ion, the relatively long contact time (8–36 seconds, or even longer for actual industrial gases from power plants) and the limitation to waste gases that do not contain copper or phenolic compounds.

It has now been found possible to obtain a much higher rate of elimination of the sulphur dioxide present in gaseous industrial effluents, and at a cost lower than that heretofore achieved. Furthermore, it is possible to obtain gaseous effluents the dew points of which are lower than the dew points of effluents purified by conventional methods. This facilitates dispersion in the atmosphere of the discharged effluent, especially during periods when the humidity is relatively high. The process according to the invention also makes it possible, in an extremely simple manner, to recover vanadium compounds contained in liquid fuels and entrained in solid form in the gaseous effluent.

According to the present invention there is provided a process for the purification of a sulfur-dioxide containing industrial effluent, comprising at least one stage consisting of a reaction in liquid phase with ozone transported by a liquid carrier fluid, in which the ozone is absorbed in the liquid prior to the reaction with the $SO_2$.

The process of the present invention can be carried out in a number of ways. For example, the gaseous effluent can be directly contacted with a liquid, for example water, oleum or sulphuric acid solution, which contains the ozone dissolved therein. This manner of carrying out the process of the invention is particularly advantageous when the carrier fluid is a sulphuric acid solution, since it is thus possible to contact the gaseous effluent, in equal proportion, with a concentration of ozone which is larger than that generally possible when using a gaseous carrier fluid for the ozone containing oxygen.

Furthermore, oxygen can be mixed with the gaseous effluent in a first stage. The mixture thus obtained is then brought into contact, in a second stage, with a solution of sulphuric acid which has absorbed a certain quantity or ozone. Or, if desired, oxygen can be added, in a second stage, to a mixture obtained by addition to the gaseous effluent, in a first stage, of a sulphuric acid solution which has absorbed a certain quantity of ozone.

The gaseous effluent and the liquid can be displaced in countercurrent or in the same direction in a chamber, the gaseous effluent circulating from bottom to top of the chamber or *vice versa*. Furthermore, the gaseous effluent and oxygen can be introduced tangentially into a first part of a chamber which is divided into several parts. The gaseous $SO_2$ containing effluent and oxygen are mixed, and then pass into a second part of the said chamber, into which is sprayed a fluid which has ozone absorbed therein. The contents of the second part of the chamber are set in rotation by an appropriate device, and the gas-liquid mixture thus obtained subsequently penetrates into a part of the chamber in which the liquid is separated from the remaining gas, for example, by means of a suitable separator.

Oxygen can be introduced at different levels of the chamber, depending on requirements.

According to one embodiment of the present invention, a current of oxygen, or of an oxygen-enriched gaseous mixture first undergoes ozonization, then passes into a solution of sulphuric acid, in which the ozone is absorbed. The recovered current of oxygen or oxygen-enriched gaseous mixture is at least partially added to the gaseous effluent to be purified in a first part of a chamber, and the remainder of the oxygen current, after drying, can be subjected to a fresh ozonization process.

In this last-described mode of procedure, excess oxygen can be recovered, so that only the quantity of oxygen strictly necessary for the reaction is used up. The excess of oxygen is recycled after purification and drying and thus it is particularly economical to carry out.

According to a second aspect of this invention, there is provided an installation for carrying out the aforesaid process.

For a better understanding of this invention and to show how it can be carried into effect, reference will now be made, by way of illustration only, to the accompanying drawing which is a flow-line of an installation embodiment which can be used for carrying out the process of the invention.

Referring to the single figure of the drawing, a current of oxygen or an oxygen-enriched gas passes into an absorption column 2, in which is disposed a device 3 which allows satisfactory gas-liquid contact to be achieved. The column 2 contains a solution of sulphuric acid, in which the ozone is absorbed to a concentration of about 3% by weight. The supply of sulphuric acid to the column 2 is maintained by a pump 18, the level of sulphuric acid being maintained in the column 2 at such a height that the orifice of a pipeline 4 is permanently covered. Oxygen is, thus, unable to escape through this pipeline.

A conduit 5, provided with a valve 6, connects the upper region of the column 2 with a device 11 for supply of oxygen thereto. Oxygen which does not enter the column 2 is recycled by passing through conduit 5' and through a cooler 7. The water which supplies the acid circulation device flows through the cooler and valve 17. The cooled oxygen is then filtered and dried in a conditioner 8. After having been compressed to a sufficient pressure it is reintroduced into the circuit along with the introduction of a further supply of oxygen from a source not shown. The oxygen then passes through ozonizer 9 and reenters the column 2.

Device 11 is housed in an upper region of a contacting chamber 1, and fumes of industrial effluent such as, for example, from a coal burning power plant enter device 11 through a tangential conduit 10. The device 11 is so designed as to ensure intimate mixing of the oxygen with the fumes. The device 11 can, for example, be formed of perforated pipes disposed radially in the upper region of the contacting chamber 1 and supplied through the center with oxygen.

The mixture of fumes and oxygen obtained in the upper region of the contacting chamber 1 is set in rotation by means of a device 12. In the installation shown in the drawing, injection into the contacting chamber 1 of acid coming from the absorber 2 through the pipe 4 can also be achieved in the region of the device 12 which can, for example, comprise fixed or movable blades, on the back of which are disposed channels 13 fed through the acid pipeline 4. It is thus possible to achieve a uniform distribution of the acid stream without the need to use small-section atomizers which are subject to clogging. If the size of the chamber permits, a plurality of successive bladed rings with different rates of flow of acid from one stage to the other can be arranged therein.

A number of rows of Raschig rings 14 are disposed in a lower region of the contacting chamber. They are not, however, essential. Contact time between gas and solution is at most 6 seconds, preferably 4-6 seconds. Discharge of the gases takes place in the lowermost region of the contacting chamber, for example, by means of a centrifugal separator 15, at the base of which the acid is collected and recycled.

The acid, whose concentration will have increased, is drawn off through a valve 16. The level of acid in the arrangement is maintained by addition of water through a valve 17. The regulation of the acid level in the column 2 is a function of the desired acid concentration and is achieved by suitable operation of the two valves 16 and 17. The acid drawn off through the valve 16 can be subjected to a decantation step (not shown), whereby the sludges of vanadium compounds can be recovered.

Before the fumes which leave the contacting chamber 1 are discharged into the atmosphere, they can be treated in an electrofilter in order to recover any traces of acid carried along therein.

It is possible to control the temperature of the gases leaving the contacting chamber 1, and hence modify the dew point thereof in different ways. For example, it is possible to cool $H_2SO_4$ before it enters the column 2. The fumes discharged into the atmosphere will not be so hot or so humid ($H_2O$ having bene retained by the formed oleums) and will be cleaner than the purified fumes obtained in known processes.

The device 3 which permits good gas-liquid contact to be made, can be any known device which allows formation of bubbles, for example a porous tube.

In place of the pump 18, one can arrange a pump on the conduit 4.

When operating the installation, the speed of the fumes of gaseous effluent in the conduit 10 is generally from 10 to 12 meters per second. In the chamber 1, some of the sulphuric acid formed by oxidation of $SO_2$ under the catalytic effect of the ozone, and by reaction with steam carried along by the fumes, reacts with nitric acid obtained in the same manner from oxides of nitrogen, and sulphonitric acids will be formed. The fumes of gaseous effluent generally enter the installation at a temperature of from 80 to 130° C., preferably from 100 to 130° C.

Under working conditions (approximately 80° C. and with an $H_2SO_4$ concentration of about 70%), about 390 mg. of ozone can be absorbed in the column 2 per liter of $H_2SO_4$.

It should be understood that many modern industrial plants, particularly those producing electrical energy from thermic power stations, release gases having only a very small quantity of oxygen therein. The oxygen concentration in these fumes may be on the order of 0.1 to 0.5%. Many known desulfurization processes will not operate on fumes containing such a small percentage of oxygen. It is an advantage of the present invention that it works equally as well with very small quantities of oxygen or relatively large quantities.

The gas-liquid contact time is calculated as the empty volume of the tower 1 divided by the volume of input gas per second at standard temperature and pressure. The gas-liquid contact time of 4-6 seconds of the present invention is a highly unexpected improvement over known processes such as that described by the Tarbutton et al. patent, 2,926,999, discussed above.

Since both the sulfuric acid and the oxygen used in the present invention may be recycled, it is no disadvantage to introduce great quantities of solution. The amount to be introduced is not critical and can easily be determined by those skilled in the art, but it is advantageous to have sufficient washing so that the yield may be as high as possible.

Furthermore, it is preferable that the ozonized oxygen entering column 2 have approximately 3% by weight concentration ozone.

The installation can be varied, however, without departing from the scope of the invention. For example, the contacting chamber 1 can be reversed, so as to receive the gaseous effluent in a lower region thereof. The effluent and liquid can be moved in countercurrent, and the oxygen can be introduced at different levels in the contacting chamber 1, depending on requirements. A heat exchanger can be arranged on the circuit of the acid liquor, so that the value of the dew point in the reaction column can be desired.

The invention will now be illustrated by the following Example:

EXAMPLE

The installation shown in the accompanying drawing was operated in such a manner that oxygen leaving the ozonizer contained 60 mg. of ozone per liter of oxygen. The effluent gas contained 0.2% oxygen. A total ozone consumption of 2.30 g., occurred, showing that the ozone only served as catalyst. However, it was necessary to use 40 liters of oxygen to obtain 2.30 g. of ozone at the concentration of 60 mg. per liter of oxygen. About 28 liters of oxygen, i.e. about 67%, were recovered and recycled. The purification efficiency of the process was of the order of 97% in respect of oxides of sulphur.

It will be obvious to those skilled in the art that various changes may be made without departing from the scope of the invention and the invention is not to be considered limited to what is shown in the drawing and described in the specification.

What is claimed is:

1. A process for substantially desulfurizing industrial effluent fumes which contain sulphur dioxide, comprising:
   mixing the fumes with oxygen;
   absorbing ozone in a solution of sulphuric acid;
   reacting the fumes and oxygen with a stream of said ozone-carrying sulfuric acid solution for a total contact time of 4-6 seconds, wherein the ozone serves substantially only as a catalyst.

2. A process in accordance with claim 1 further including the step of:
adding further oxygen to the mixture obtained by contacting the fumes with the sulfuric acid solution and absorbed ozone.

3. A process in accordance with claim 1 wherein the fumes and the sulfuric acid solution are displaced in counter-current, the fumes circulating upwardly.

4. A process in accordance with claim 1, wherein the fumes and the sulfuric acid solution are reacted in a co-current deposition.

5. A process in accordance with claim 1, wherein:
said reacting step comprises spraying the sulfuric acid solution with the absorbed ozone into the fume-oxygen mixture and causing the fume-oxygen mixture to be set into rotation; and further including the step of
separating the gas-liquid mixture.

6. A process in accordance with claim 5 wherein said absorbing step includes:
ozonizing a stream of oxygen;
passing the ozonized stream of oxygen through said sulfuric acid solution in which the ozone is absorbed;
recovering the stream of deozonized oxygen from the carrier fluid;
partially feeding the oxygen to the fumes for use in said mixing step;
drying the excess oxygen; and
feeding the dried oxygen to the stream of oxygen for use in said ozonizing step.

7. A process in accordance with claim 1 wherein the industrial effluent fumes originally contain only 0.1-0.5% oxygen.

8. A process in accordance with claim 6 wherein said ozonized stream of oxygen contains about 3% by weight of concentration in ozone.

9. A process in accordance with claim 1 wherein said reacting step takes place in a packed column.

10. A process in accordance with claim 1 wherein the ozone is absorbed to a concentration of about 3% by weight.

11. A process in accordance with claim 1 wherein the fumes are at a temperature of 80–130° C.

12. A process in accordance with claim 11 wherein the fumes are at a temperature of 100–130° C.

13. A process in accordance with claim 1 wherein the concentration of said sulfuric acid solution is about 70%.

References Cited

UNITED STATES PATENTS

| | | | |
|---|---|---|---|
| 659,236 | 10/1900 | Johnson | 423—522 |
| 1,364,573 | 1/1921 | Moore | 423—532 X |
| 1,530,714 | 2/1921 | Crist | 423—522 X |

FOREIGN PATENTS

| | | | |
|---|---|---|---|
| 14,185 | 1852 | Great Britain | 423—522 |
| 930,584 | 1963 | Great Britain | 423—522 |
| 1,234,912 | 1967 | Germany | 423—522 |

OTHER REFERENCES

"Chemical Abstracts," vol. 31, 1938, p. 414.

GEORGE O. PETERS, Primary Examiner

U.S. Cl. X.R.

55—73